United States Patent [19]

Bowhay

[11] Patent Number: 4,608,759

[45] Date of Patent: Sep. 2, 1986

[54] VERNIER AND/OR DIAL CALIPER COMPARATIVE READING POINT CHECKING SELECTIVE ACCESSORY ATTACHMENTS AND THEIR COMBINATIONS

[76] Inventor: Philip E. Bowhay, 1203 E. Racine St., Bellingham, Wash. 98225

[21] Appl. No.: 534,488

[22] Filed: Sep. 21, 1983

[51] Int. Cl.[4] .............................................. G01B 5/02
[52] U.S. Cl. ................................ 33/143 M; 33/147 T
[58] Field of Search ............. 33/143 M, 143 J, 143 K, 33/147 T, 147 J, 167, 173

[56] References Cited

U.S. PATENT DOCUMENTS

| | | | |
|---|---|---|---|
| 129,349 | 7/1872 | Kellogg | 33/143 R |
| 207,308 | 8/1978 | Schmitter | 33/143 M |
| 1,370,310 | 3/1921 | Gustavson | 33/167 |
| 1,659,915 | 2/1928 | Hilfiker | 33/167 |
| 1,901,719 | 3/1933 | Baroni | 33/143 M |
| 2,212,884 | 8/1940 | Polasik | 33/143 K |
| 2,361,631 | 10/1944 | Jakubiak | 33/143 M |
| 2,467,263 | 4/1949 | Krisanda | 33/143 M |
| 2,529,931 | 11/1950 | Gallup, Sr. | 33/143 M |
| 2,741,848 | 4/1956 | Livingston | 33/167 |
| 2,791,032 | 5/1957 | Barrett | 33/143 R |
| 3,562,773 | 2/1971 | Wilamowski | 33/143 J |
| 4,201,226 | 5/1980 | Phillips | 33/143 J |
| 4,202,109 | 5/1980 | Schasteen | 33/143 M |
| 4,291,465 | 9/1981 | Hemeyer | 33/143 M |

FOREIGN PATENT DOCUMENTS

| | | | |
|---|---|---|---|
| 2030765 | 12/1971 | Fed. Rep. of Germany | 33/143 M |
| 909955 | 5/1946 | France | 33/147 T |
| 282709 | 3/1928 | United Kingdom | 33/143 |

OTHER PUBLICATIONS

John Dernoga, Caliper Attachments Check Odd Shapes, Oct. 26, 1956, p. 1748, Metalworking Production.

Primary Examiner—Charles Frankfort
Assistant Examiner—Thomas B. Will
Attorney, Agent, or Firm—Roy E. Mattern, Jr.

[57] ABSTRACT

Vernier and/or dial caliper comparative reading point checking selective accessory attachments and their combinations, substantially add to the versatility of conventional vernier and dial calipers by their selective additions, which are all undertaken, quickly and conveniently, without altering the respective conventional calipers. Depending on the selection of such accessory attachments, otherwise hard or impossible dimension checking locations are quickly and conveniently reached, such as hard to reach slots, grooves, pockets, webs, etc. Each outside dimension locating leg, jaw, or blade of either a dial or vernier caliper receives a respective left or right positioning body of the accessory attachments, to interfit, via longitudinal slots of the body, a respective left or right leg, jaw, or blade, and to interfit, via transverse slots and transverse holes, respective contacting blades or respective contacting rods of the accessory attachments, used in reading respective inside and outside dimensions to thereby check dimensions at various selected points or locations throughout a machined part or product. Set screws are used to position and to hold the positioning slotted bodies in place on the caliper legs, and cap screws are used to position and to hold the respective contacting blades or respective contacting rods, on the positioning slotted bodies. Allen wrenches are used to tighten and to loosen the set screws and cap screws.

1 Claim, 7 Drawing Figures

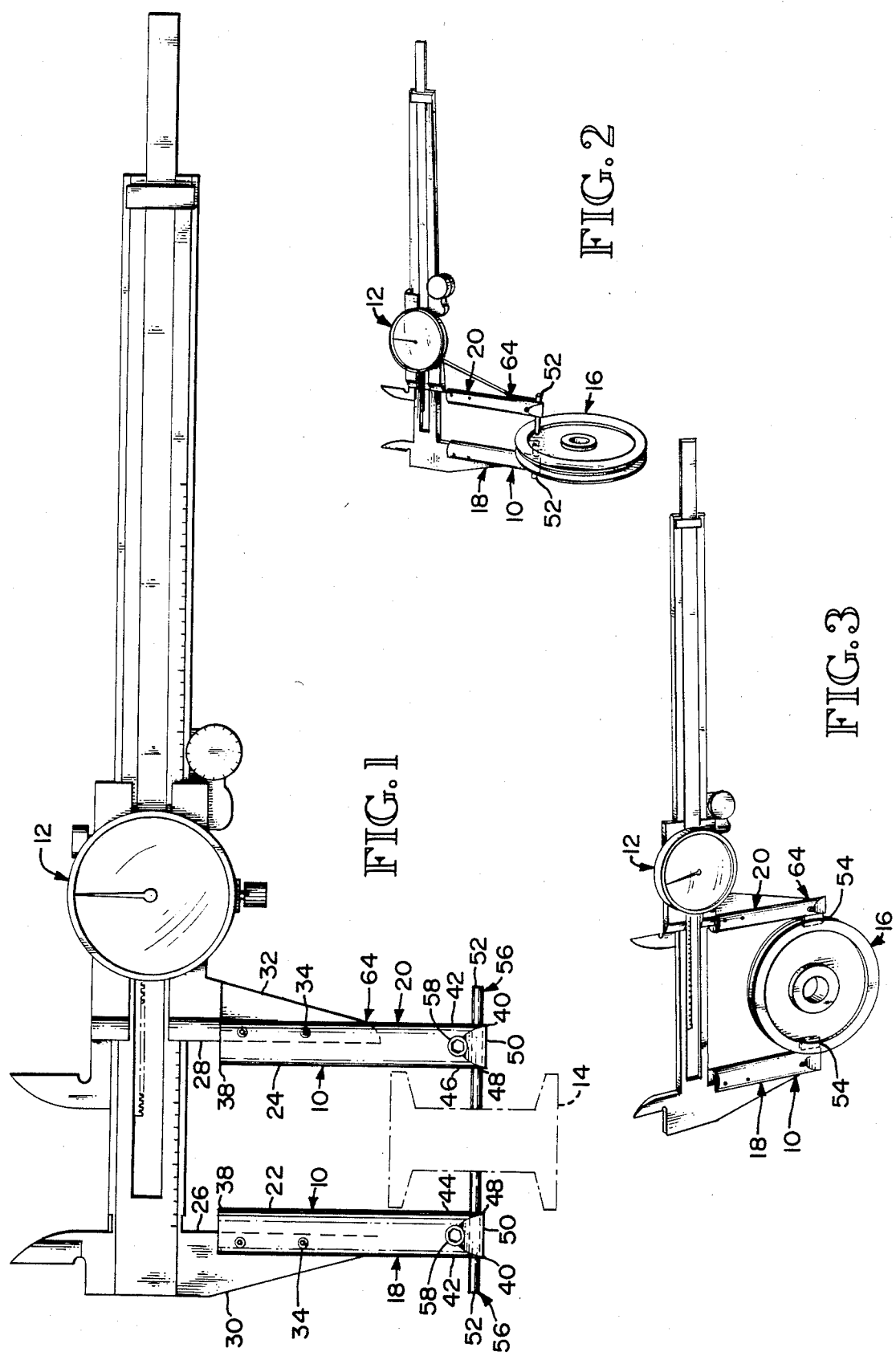

4,608,759

VERNIER AND/OR DIAL CALIPER COMPARATIVE READING POINT CHECKING SELECTIVE ACCESSORY ATTACHMENTS AND THEIR COMBINATIONS

BACKGROUND OF THE INVENTION

A review of patents indicates calipers have been fitted with accessories to improve and to expand their use in checking the measurements and sizes of machined parts and products. In 1872, E. C. C. Kellogg in his U.S. Pat. No. 129,349 provided slide on tiltable arm accessories for the legs of calipers to measure tapered surfaces. In 1878, Anton Schmitter in his U.S. Pat. No. 207,308, provided slide on accessories for the legs of calipers to change the calipers from the inside to outside calipers without changing the position of the slide of the caliper. In 1928, A. Hilfiker in his U.S. Pat. No. 1,659,915 illustrated caliper attachments for measuring undercut beveled surfaces. In 1949, John Krisanda in his U.S. Pat. No. 2,467,263 disclosed removable caliper attachments to add to the measuring jaws, i.e. legs, or blades, of his calipers. They were divider and caliper point accessories for making additional measurements, not possible to be undertaken when only the original measuring jaws were available. In 1950, John Gallup in his U.S. Pat. No. 2,529,931 depicted his auxiliary selective contact accessories for calipers. The respective contact accessories were used to measure beveled surfaces, and other irregular surfaces such as internal and external gear teeth. In 1980, Thomas Schasteen in his U.S. Pat. No. 4,202,109, set forth his thread gauge, which is an attachment for the blades of a caliper to be used in measuring the pitch diameter of threads of a machined product such as a bolt. In 1981, Arley Heinayer in his U.S. Pat. No. 4,291,465, illustrated his caliper accessory for extending the measurement range of the caliper. These inventors disclosed how conventional calipers could be equipped with accessories to increase the types of measurements which could be undertaken.

Even though the prior offered measuring instruments and their accessories appear at first to have filled all the needs of a machinist, there still remained a need whereby a machinist could be provided with accessories to make his vernier and/or dial calipers more universally useful in determining very accurately the correctness of many difficult to reach places on products being machined. In so fulfilling the need, the machinist would be able to quickly mount, remove, and change the accessories without damaging his or her calipers or the accessories, and moreover, the machinst could imaginatively add to the configurations of the contacting points, blades, bars, pins, etc.

SUMMARY OF THE INVENTION

Vernier and/or dial caliper comparative reading point checking selective accessory attachments and their combinations are now available in what is known as a vernier point checking kit. This kit is preferably provided in a small box, ½" by 2" by 3", containing two positioning bodies right and left hand, i.e. of opposite hand, which are longitudinally slotted for an overlapping slidable fit about the inside portions of the outside measuring blades, jaws, or legs of a machinist's conventional caliper. Also in the kit box are selective pairs of contacting rods and contacting blades of different configurations, which are transversely mountable in the respective ends of the positioning bodies in either transverse slots or holes. Set screws and cap screws, with complementary Allen wrenches, are included in the kit box to complete this vernier point checking kit, which in conjunction with the machinist's calipers, provide the vernier and/or dial caliper comparative reading point checking selective accessory attachments and their combinations.

DESCRIPTION OF THE DRAWINGS

The preferred embodiments of the vernier and/or dial caliper comparative reading point checking selective accessory attachments and their combinations are illustrated in the drawings, wherein:

FIG. 1 is a side elevational view illustrating a dial caliper having the comparative reading point selective accessory attachments secured and positioned to comparatively read the thickness dimension of an I-beam shaped product using contacting rods;

FIG. 2 is a perspective view of a dial caliper similarly arranged, as in FIG. 1, with comparatively reading point selective accessory attachments secured and positioned to comparatively read the web thickness of a pulley wheel using contacting rods;

FIG. 3 is a perspective view of a dial caliper with comparatively reading point selective accessory attachments secured and positioned to comparatively read the diameter of a groove of a pulley wheel using contacting blades;

DESCRIPTION OF THE PREFERRED EMBODIMENTS

Figure 4:
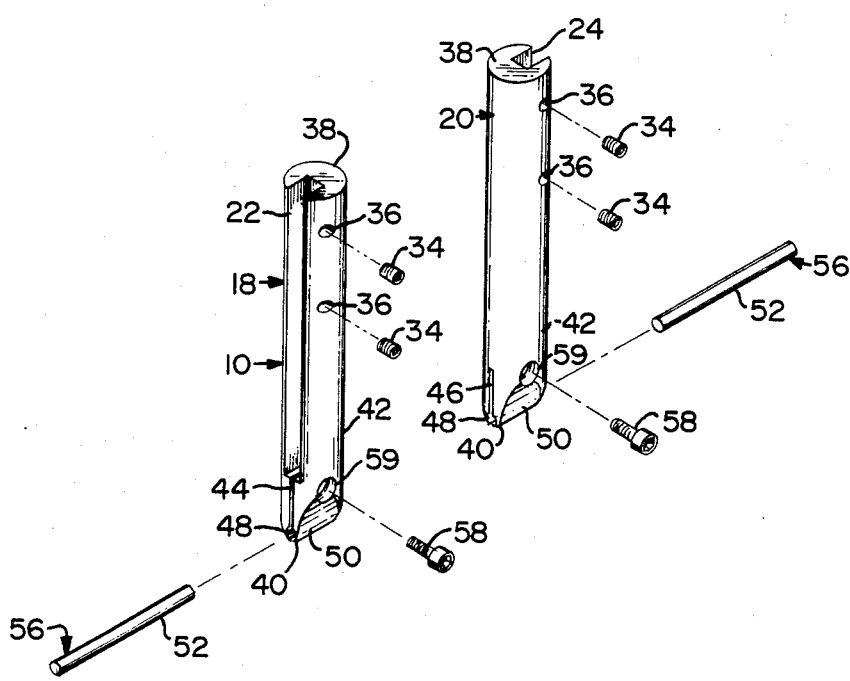
FIG. 4 is an exploded perspective view of the vernier and/or dial caliper comparative reading point checking selected accessory attachments inclusive of contacting rods and the respective cap screws and set screws.

The preferred embodiments of the vernier and/or dial caliper comparative reading point checking selective accessory attachments 10 and their combinations, illustrated throughout the drawings, are provided in a comparatively low cost small size vernier point checking kit of high quality components, which provide a machinist with such accessories to make his or her conventional vernier and/or dial caliper, universally adaptable to quickly undertake almost all difficult measurements. In FIGS. 1, 2, and 3, a conventionl dial caliper 12 is illustrated equipped with selected components of the comparative reading point checking selective accessory attachments 10, to read the thickness of an I-beam shaped product 14 in FIG. 1, the thickness of a web of a pulley wheel 16 in FIG. 2, and the diameter of a groove of a pulley wheeel 16 in FIG. 3.

An illustrated in FIG. 4, respective left and right positioning bodies, 18, 20, derived preferably from round stock, are provided for being slidably positioned, utilizing their elongated partial slots 22, 24, on the insides 26, 28 of the legs 30, 32 of the dial caliper 12, which initially were used solely for making outside measurements. These legs 30, 32 of the caliper 12 are also referred to by machinists as being the blades or jaws of the calipers. Once the positioning bodies 18, 20 are firmly located to continue the parallelism of the legs 30, 32, various set screws 34 are tightened in place, via the tapped holes 36, to firmly and frictionally hold the positioning bodies 18, 20 in their selected locations, without causing any damage or alteration to the machinist's caliper 12.

The elongated partial slots 22, 24 of the positioning bodies 18, 20 commence at the top 38 of each one but stop well short of the bottom 40 of each one. Then the bottom and near bottom portions 40, 42 of the positioning bodies 18, 20 are completely transversely slotted 44, 46 in the same geometric centered longitudinal plane of the elongated partial slots 22, 24. Also centered in each transverse slot 44, 46 is a transverse hole or bore 48. The outer portions 50 of the near bottoms 42 are tapered to provide flexibility in the near bottoms 42, whereby, after the installation of either contacting rods 52, or contacting blades 54, or like purpose contacting parts 56, the tightening of a cap screw 58 holds the respectively selected machined part contacting parts 56 firmly in place, via hole 59.

Figures 5, 6, 7:
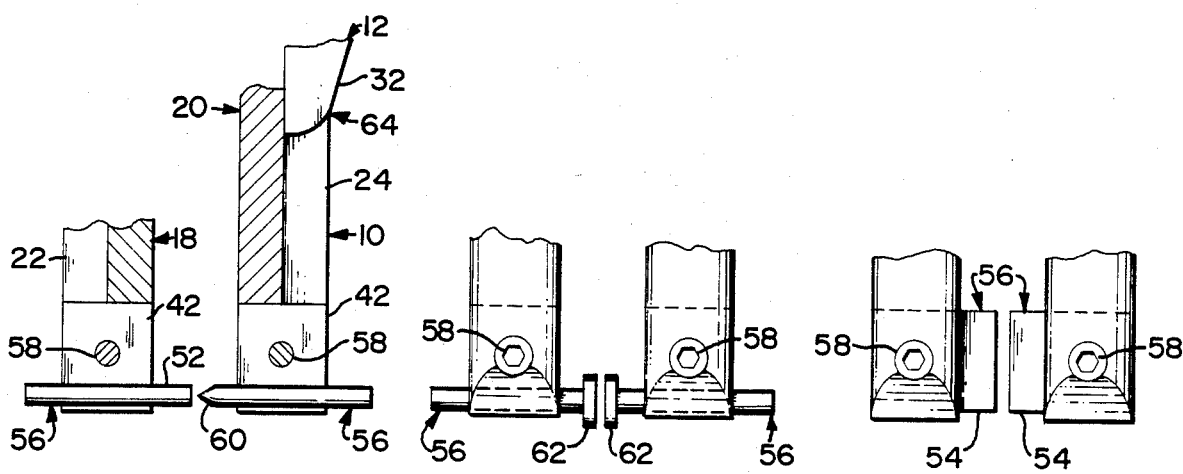
FIG. 5 is a partial elevational view, with portions removed, to illustrate the selectable placement of the positioning body on a leg of a caliper, and the selection of contacting rods, one with a pointed contacting end and the other with an abutting planar end.
FIG. 6 is a partial elevational view, with portions removed, similar to FIG. 5, to illustrate the use of contacting rods having enlarged abutting planar ends, i.e. flanged ends.
FIG. 7 is a partial elevational view, with portions removed, similar to FIG. 6, to illustrate the use of contacting blades; and in reference to all the figures to indicate how a machinist may provide different contacting members of many configurations to reach areas and places of machined products, which cannot be reached by using only a conventional vernier and/or dial caliper without these accessories.

Other arrangements of selected machined part or product contacting parts 56 of these accessory attachments 110 are illustrated in FIGS. 5, 6 and 7. Others are available but not illustrated, and all these product contacting parts 56 in their various configurations are made to enable the machinist to correctly ascertain an important dimension, not otherwise ascertainable with his or her conventional caliper. By way of example, in FIG. 5, one of the contacting rods 52 has the planar abutting end, whereas the other rod 60 has a pointed end. In FIG. 6, each contacting rod 62 has a larger flange or abutment end. In FIG. 7, the contacting blades 54, also shown in FIG. 3, are illustrated in greater detail. Other contacting parts 56 may be rods which are bent, blades which are enlarged and/or shaped, etc.

In all these embodiments of contacting parts 56, the objective remains, to adequately contact a machined part or product at all points of critical dimension checking, using any selected conventional calipers 12, vernier, dial, etc. equipped with this removable and non damaging comparative reading point checking selective accessory attachments and their combinations 10. in such overall combinations 64, the accuracy of the conventional calipers 12 is maintained, utilizing the scale and dial readings thereof, via comparative readings, based on the initial adjacent directly contacting position of a selected pair of contacting parts 56, such as contacting rods 52 or contacting blades 54. The vernier point checking kit made available to machinists, includes the illustrated components and also respective Allen wrenches to tighten and to loosen the respective set screws 34 and cap screws 58.

I claim:

1. An accessory assembly of components used in vernier point checking adapted for removable securement to a conventional vernier and/or dial caliper, which is not thereby physically altered, for comparative reading point checking of more portions of machined parts, comprising:

(a) left and right vertical cylindrical positioning bodies, each longitudinally partially slotted half way through the longitudinal diameter, with these longitudinal slots extending vertically and continually from the top and down four fifths of the length of each respective vertical cylindrical positioning body, with each of these slots being wide enough to closely fit substantially all of an inside facing edge of a conventional leg of the conventional caliper, which otherwise would be normally used in making outside measurements of a machined part;

two spaced threaded holes in each left and right cylindrical positioning body, and threaded set screws threaded into these two spaced threaded holes, which upon tightening, are adapted to hold these left and right cylindrical positioning bodies on respective legs of the caliper;

a thin slot adapted to receive a planar contacting part, extending transversely and longitudinally throughout the last fifth of the length of each vertical cylindrical positioning body;

the last fifth of the length of each vertical cylindrical positioning body being tapered on each side of each cylindrical positioning body;

a bore, extending transversely through the last fifth of the length, where it is tapered, and also arranged parallel to and in contact with the slot, and adapted to receive cylindrical contacting parts;

a threaded hole extending through each of the last fifth of lengths at a right angle to the respective thin slot;

a threaded set screw threaded into this threaded hole extending through each of the last fifth of lengths, which, upon tightening holds a contacting part in the bore and/or slot; and (b) left and right machine part contacting parts, either being initially cylindrical or planar selected from many of different designs, such as rod and/or blade, slidably inserted in the last fifth of the left and right cylindrical positioning bodies, selectably utilizing respective said thin slots and/or bores, and the respective threaded holes and threaded set screws.

* * * * *